United States Patent [19]
Norton et al.

[11] Patent Number: 5,170,459
[45] Date of Patent: Dec. 8, 1992

[54] OPTICAL FIBER ATTACHMENT STRUCTURE AND METHOD

[75] Inventors: Douglas A. Norton, Alliance, Ohio; Elvin E. Herman, Pacific Palisades, Calif.; Bart E. Likes, Issaquah, Wash.

[73] Assignee: Hughes Aircraft Company, Los Angeles, Calif.

[21] Appl. No.: 752,393

[22] Filed: Aug. 30, 1991

[51] Int. Cl.$^5$ .............................................. G02B 6/22
[52] U.S. Cl. .................................... 385/128; 385/124; 385/139
[58] Field of Search ............... 385/128, 122, 123, 124, 385/125, 126, 127

[56] References Cited

U.S. PATENT DOCUMENTS

| | | | |
|---|---|---|---|
| 4,410,567 | 10/1983 | France et al. | 385/126 X |
| 4,418,984 | 12/1983 | Wysocki et al. | 385/127 |
| 4,848,869 | 7/1989 | Urruti | 385/128 |
| 4,893,895 | 1/1990 | Berthold et al. | 385/123 |
| 5,074,643 | 12/1991 | Petisce | 385/128 |

*Primary Examiner*—John D. Lee
*Assistant Examiner*—Phan T. Heartney
*Attorney, Agent, or Firm*—L. A. Alkov; W. K. Denson-Low

[57] ABSTRACT

An attachment structure is described that provides means for holding and for applying tensile force to an optical fiber clamped therein. Attachment to an optical fiber is accomplished by stripping the buffer layer(s) from a portion of the fiber and casting a thermosetting polymer encapsulating and compressing member thereon at elevated temperature so that, at lower than the polymer curing temperature, the cast polymer encapsulating member is in compression on the bared fiber and on a short portion of its adjacent buffer layer(s). A tension wire which provides a means for applying external force to the optical fiber has one end inserted axially in the mold for incorporation into the cast encapsulating member. The wire is also placed under compression at temperatures below that of the curing temperature of the polymer. To maintain compression over temperature elevated temperatures, a restrictive cylindrical coil spring is directly engaged around the encapsulating member. Alternatively, a metallic restrictive member may be electro-formed on the encapsulating member. This attachment device is suitable for clamping either an optical fiber that extends out each end of the attachment device, or for clamping an optical fiber where its end terminates within the attachment structure.

12 Claims, 3 Drawing Sheets

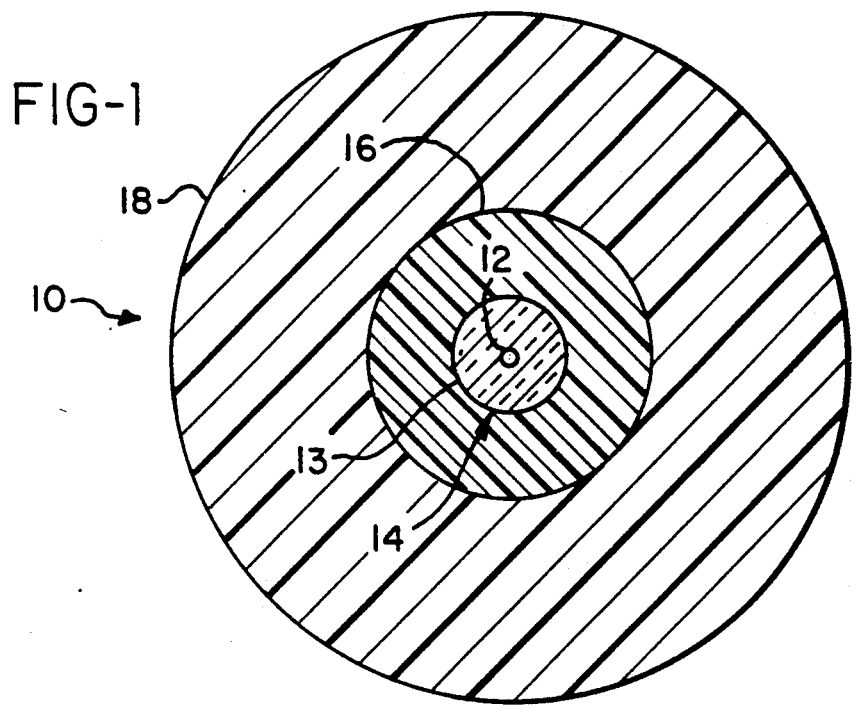
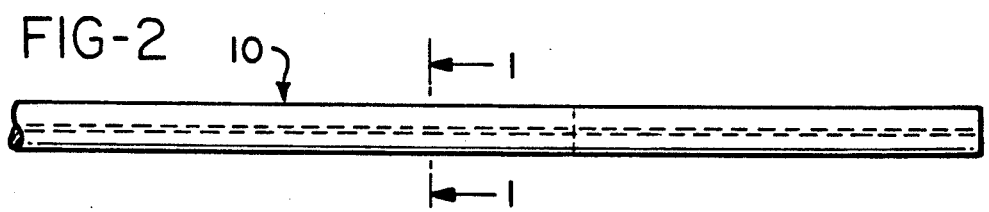
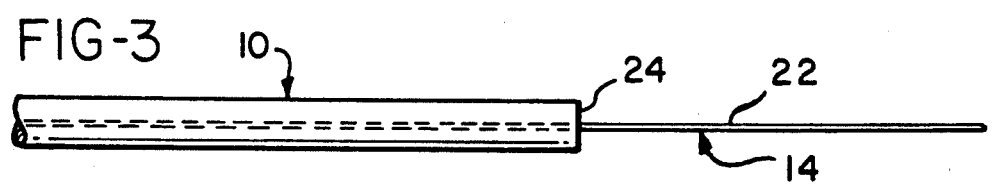
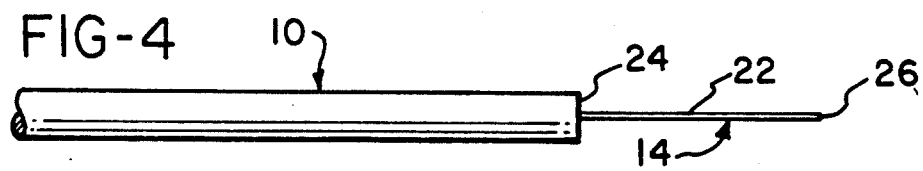
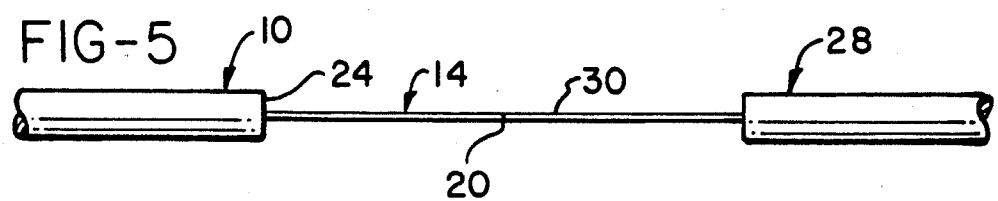

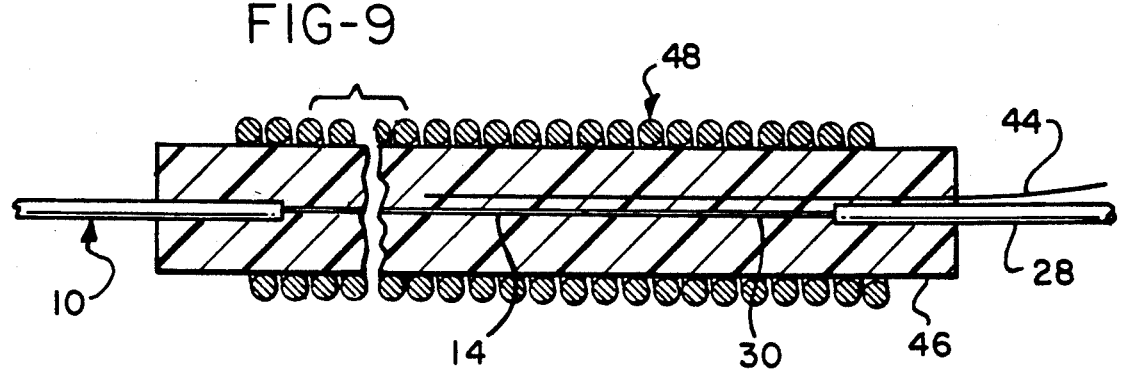
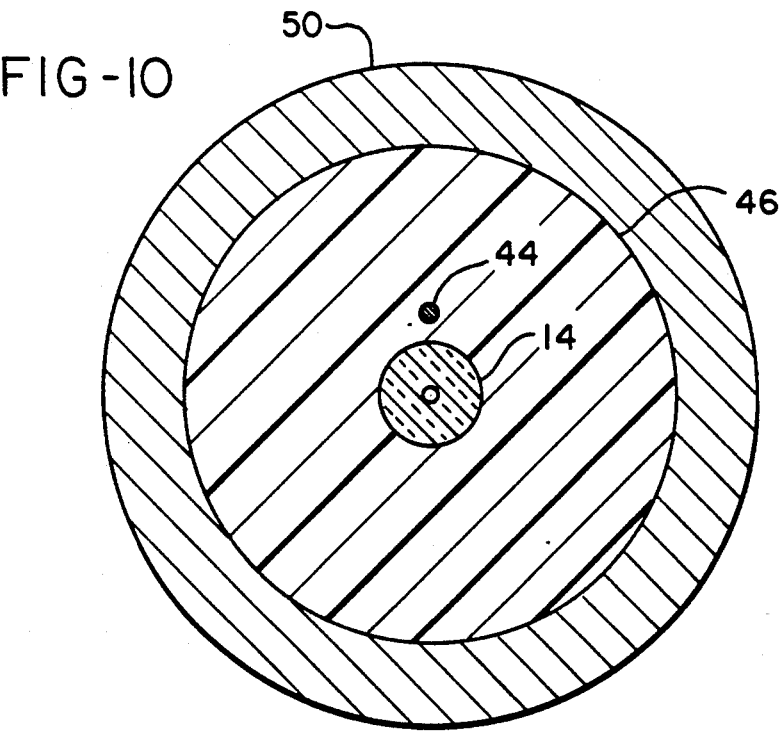

OPTICAL FIBER ATTACHMENT STRUCTURE AND METHOD

FIELD OF THE INVENTION

This invention is directed to the structural attachment of the end of an optical fiber so that it can be placed under tension, and to the method by which the attachment is accomplished.

BACKGROUND OF THE INVENTION

Optical fibers are structures which have an optically transparent core of small diameter and an optical cladding thereover. Protective covers called buffer coatings are applied thereover. In a convenient structure, a silicone coating is applied over the cladding and a teflon layer is applied over the silicone. These buffer coatings serve to protect the fiber cladding from scratching, and they serve to minimize sharp bends, micro-crack formations, and contact with water which causes expansion of micro-cracks when the fiber is stressed. The core and cladding, plus its buffer coatings are considered the optical fiber in the descriptions to follow. Correspondingly, the cladded fiber core, absent its buffer coatings, will be referred to hereinafter as the bare fiber. This fiber is to carry an optical signal therethrough. Fiber optics have existed for thirty years, and their purpose need not be explained.

There is often need to physically anchor the ends and intermediate portions of the fiber in place to support the fiber and to take the stress off of the optical connectors at the ends of the fiber. In other applications, it is necessary to put the optical fibers in tension. Such an application is in remote sensors such as pressure or temperature sensors of the optical interferometer type. In one such sensor, the optical path legs of an interferometer utilize single-mode optical fibers, and one leg of the interferometer is stretched in proportion to the sensed parameter. The use of such optical fibers in an interferometer permits the utilization of a sensing element which can operate in a non-benign environment such as down-hole in a deep oil or gas well where the temperatures are quite high. By using optical fibers in such an interferometer, mechanical ruggedness and long-term reliability are achieved, and a single optical fiber can serve as the two-way data link between the remote sensor and the readout station.

One type of installation in which an attachment of an optical fiber is taught is in E. E. Herman and Bart Likes U.S. Pat. No. 4,859,844, directed to a Comb Filter Pressure/Temperature Sensing System. In that teaching, an optical fiber comprises one leg of a Michelson or Mach Zehnder interferometer in a remote sensing module. In the interferometer, one leg in the remote sensing module is caused to increase in length as a direct function of the sensor parameter, for example, pressure or temperature. This increase in length can be accomplished in the pressure sensor by the use of a Bourdon tube that serves as a transducer converting the sensed pressure to mechanical displacement, thereby causing tension-induced elongation of the optical fiber. The other optical fiber leg of the interferometer serves as a reference. As a function of the resultant differential length between the two legs of the optical interferometer, optical interference occurs at the output of the interferometer where the two legs or optical paths are combined. Various techniques can be used to process this optical signal to provide an unambiguous measurement of the sensed parameter. Remote parameter sensing can thus be accomplished by utilizing some form of transducer in the remote sensing module that translates the sensed parameter into a variation of the differential length between the two legs of the interferometer.

In attaching an optical fiber to a mechanical transducer or fixed attachment point, that fiber must be firmly grasped in a bared region thereof so that it is capable of withstanding considerable tension without slippage or pull-out. Sharp bends and other causes of stress localization in the fiber must be avoided. The attachment device must also be compatible for providing control of fiber tension and fiber rotation during assembly, adjustment, and/or operation. Means must also be provided for mechanically coupling to the attachment device so that tension can be exerted axially on the optical fiber without causing significant bending of the tensioned fiber where it exits from the attachment device.

The requirements of such an optical fiber attachment means in a non-benign sensing application, such as down-hole in a deep oil well, are several-fold. The temperature environment where the remote sensing module must operate in deep oil and gas wells may be as high as 225 degrees C. Long life is important because of the difficulty of replacement. Accuracy must be maintained because calibration may be impossible in the field. The sensing module must also be mechanically rugged. There is need for a proper optical fiber attachment structure to meet such application needs.

SUMMARY OF THE INVENTION

In order to aid in the understanding of this invention, it can be stated in essentially summary form that it is directed to an optical fiber attachment structure and method wherein the structure comprises a synthetic polymer body encapsulating and compressing an optical fiber. A flexible tension member, such as wire may also be included in and extending from the body to support or apply external axial stress to the fiber. The method comprises baring the fiber, molding a polymer material onto the fiber and one end of a flexible tension member, and applying an external restrictive member to the body to maintain compression therein over a wide temperature range.

It is thus a purpose and advantage of this invention to provide a structure mechanically bonded onto an optical fiber whereby the bared fiber is grasped without inducing localized stress points that might weaken the fiber and thereby leads to fiber breakage.

It is another purpose and advantage of this invention to provide an attachment structure which includes a polymer body molded onto the fiber that provides continuity of protection over the bared regions of the fiber embedded therein.

It is another purpose and advantage of this invention to provide a fiber attachment structure which includes a polymer body molded onto the fiber for encapsulating and compressing with an external restrictive structure to maintain compression of the fiber in that polymer body over a wide temperature range.

It is a further purpose and advantage of this invention to provide an optical fiber attachment means which is suitable for applying axial forces to an optical fiber in an interferometer-type sensor so that such sensors can be used in adverse environments wherein high temperatures might be found.

It is a further purpose and advantage of this invention to provide an attachment structure which has a high level of area-distributed compressive forces on the optical fiber so that the bared fiber is uniformly clamped with no localized stress points which would weaken the fiber, and continuity of protection is provided throughout the bared region of the fiber.

It is another purpose and advantage of this invention to provide a method by which a tension member is engaged on the polymer body so that mechanical attachments can be applied to an optical fiber for the support and/or axial tensioning of the fiber.

Other purposes and advantages of this invention will become apparent from a study of the following portion of this specification, the claims and the attached drawings wherein:

BRIEF DESCRIPTION OF THE DRAWINGS

FIG. 1 is an enlarged cross section through an optical fiber, including its buffer coatings therein, as seen generally along the line 1—1 of FIG. 2.

FIG. 2 is a side-elevational view of the optical fiber.

FIG. 3 is a side-elevational view of the same fiber, showing the buffer coatings stripped away at one end thereof.

FIG. 4 is a view similar to FIG. 3, showing the bared fiber cleaned and cleaved and the buffered fiber extending from the bared region.

FIG. 5 is a side-elevational view showing the ends of two bared fibers, such as shown in FIG. 4, fused together for use when the optical fiber must extend from each end of the attachment device.

FIG. 9 shows the completed attachment structure including the molded polymer encapsulating and compressing body, tension member and restrictive member, in longitudinal, substantially centerline section.

FIG. 10 is an enlarged section taken through the attachment structure with another embodiment of the restrictive member.

DESCRIPTION OF THE PREFERRED EMBODIMENT

Figure 6:
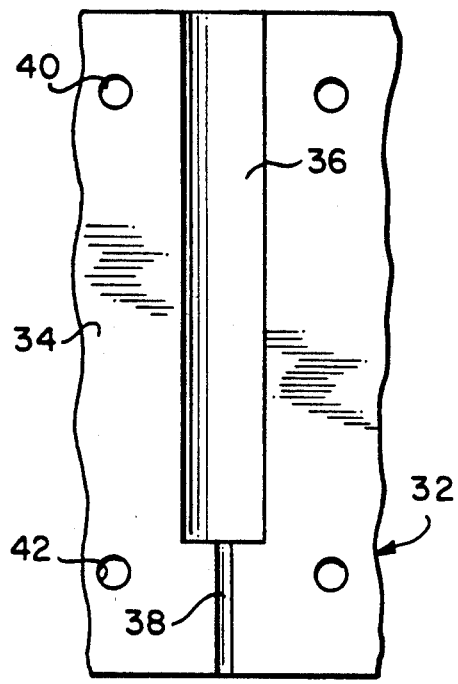
FIG. 6 is an elevational view of a mold half for molding the attachment structure on the fiber.

FIGS. 1, 2, 3, 4 and 5 show a coated optical fiber 10. In a specific embodiment, the fiber 10 comprises a core 12, which carries the optical signal. The core 12 had a cladding 13 which serves the optical effect of ensuring that the light travels in the core 12 of the fiber 10. As conventionally described, the core 12, together with its cladding 13, carries the signal. The optical fiber without its protective buffer coating is referred to hereinafter as the bare fiber, indicated at 14. To protect the bare fiber 14, it is coated with flexible buffer coatings. For example, the bare optical fiber 14 has a silicone buffer coating 16 overlaying the cladding and has a tetrafluoroethylene (TFE) buffer coating 18 overlaying the silicone buffer coating. Together, these coatings 16 and 18 are considered the buffer coatings. In a particular example, a single-mode optical fiber's core 12 has a diameter of 5 microns, the cladding 13 has an outer diameter of 125 microns, the silicone buffer coating 16 has an outer diameter of 280 microns, and the TFE buffer coating 18 has an outer diameter of 650 microns.

The buffer coatings 16 and 18 must be capable of withstanding, without damage, the high temperatures that may be encountered in the operational environment. In like fashion, these buffer coatings must also be capable of withstanding the elevated temperatures involved as part of the fabrication of the attachment structure of this invention. In particular, elevated temperatures are required to thermoset (cure) the polymer material of the attachment structure when it is molded (cast) around the optical fiber.

The thermosetting polymer material has a higher coefficient of thermal expansion than that of the optical fiber core and cladding. Therefore, after the polymer material has cured and as the assembly cools, the cast polymer material shrinks and applies compressive forces to the fiber, since the latter incurs less shrinkage than the cast polymer. The cast polymer material thus becomes an encapsulating and compressing body. However, in an adverse operational environment, when temperatures are again encountered that may approach the curing temperature of the polymer encapsulating body, that material, unless otherwise constrained, would expand outward, thereby lessening the compressive forces that clamp the bare fiber. With the tension levels entailed in an optical interferometer using optical fibers in its legs, the reduced compressive forces at elevated temperatures might allow the optical fiber to slip, or even allow it to be pulled out of cast polymer encapsulating body.

As will be explained in detail hereinbelow, to counteract that reduction of these compressive forces at elevated temperatures, the restrictive member 48 shown in FIG. 9 or the restrictive member 50 shown in FIG. 10 serves to apply, at increasing temperatures, an increasing, inwardly directed, external restrictive force to the outside of the cast polymer encapsulating body. Therefore, the cast polymer encapsulating body is constrained from expanding outward. As a consequence, the compressive force on the bare fiber exerted by the polymer material is maintained or increased keeping the bare fiber and the tension member firmly clamped.

Interferometers utilizing tensioned fibers as their legs are described in two of the exemplary embodiments of E. E. Herman and Bart Likes U.S. Patent No. 4,859,844 directed to a "Comb Filter Pressure/Temperature Sensing System." In such interferometers, the light is split into two optical fibers which serve as legs of the interferometer. These optical fiber optic legs of the interferometer are placed under tension where the tension on the reference leg remains fixed, while the tensile force applied to the other leg is varied in accordance with the sensed parameter.

In a Mach Zehnder type interferometer, the optical output from these two legs is then recombined and relayed through another fiber to the signal processor. Since its nature of operation requires only light transmission and not reflection, the Mach Zehnder interferometer requires that the optical fibers extend on through all four attachment devices.

In the Michelson type interferometer, the far ends of the two optical fibers that serve as the legs of the interferometer are cleaved to provide a perpendicular smooth surface and then silvered to provide highly reflective surfaces. As a result, light is reflected back up each respective optical fiber leg where it is recombined for relay back to the signal processor. In this type of interferometer, two of the attachment devices require that the fiber feed through the attachment device; i.e., the fiber extends on through the attachment device. However, in the other two attachment devices, the fiber reflective ends are embedded (buried) in the molded polymer encapsulating and compressing bodies of their respective attachment devices. Such a procedure provides excellent mechanical protection for the fiber reflective surfaces on the ends of the fibers.

The attachment means and method of this invention is suitable for both the optical fiber feedthrough requirement, as well as for the optical fiber buried-end requirement. The attachment device fabrication method for the feedthrough fiber requirement will be described first. That description will be followed by the description of a minor variation in the fabrication method utilized for the buried-end fiber application requirement.

As mentioned previously, it is necessary to remove the buffer coatings from a limited region of the fiber so that highly compressive forces can be applied to that bare fiber region. At the same time, it is critically important to engage a small portion of the fibers' protective coatings inside the ends of the molded polymer encapsulating body to provide continuity of fiber protection after the polymer is cast around the fiber.

Ideally, for the feedthrough optical fiber attachment requirement, a region of the continuous fiber would be stripped of its protective buffer coatings to provide the required bared fiber region. However, in practice, stripping of that limited region is quite difficult. Even with the use of chemicals to soften the buffer coating layers, it is typically necessary to abrade the coatings to provide a starting point from which to extend the stripped region. Since the fiber is continuous, the softened coating layers must then be split along their length in order to remove them from the underlying bare fiber. Because the unprotected bare fiber is extremely fragile, these processes are quite difficult to perform without incurring micro-scratches and/or breakage of the bared fiber. For these reasons, the preferred method describe here is to break the fiber, strip each end for a limited region, cleave the ends, and resplice them together, leaving the desired bared fiber region. Stripping the ends of the fiber, as required by this approach, is relatively easy because the buffer coatings can be slid off the bare fiber ends, with minimal damage done to the bared fiber in the process.

In preparing the fibers for the feedthrough attachment, the first step in the process is to strip back each fiber's buffer coatings to expose a region of bare fiber, as described above. In FIG. 3, the exposed bare fiber is indicated at 22, and the end of the buffer coatings is indicated at 24. The buffer coatings are stripped back about 1.7 inches. Each exposed bare (cladded) optical fiber 14 is cleaned with a solvent and cleaved to result in very smooth and perpendicular end-face 26 seen in FIG. 4. The position of each cleaved end is such as to leave about 1 inch of bare optical fiber 14 extending out of the buffer coatings. The second such coated optical fiber is indicated at 28 in FIG. 5. Its bare optical fiber 30 is cleaved and spliced to the bared and cleaved end of fiber 14 using a modern fusion splicer to ensure minimum splice loss. The splice point is shown at 20 in FIG. 5. The splice should be in the center of the bared region for optimum reliability. The bare optical fiber region of the spliced pair of fibers is about 2 inches between the ends of the buffer coats. The pair of spliced fibers is shown in FIG. 5.

Figure 7:
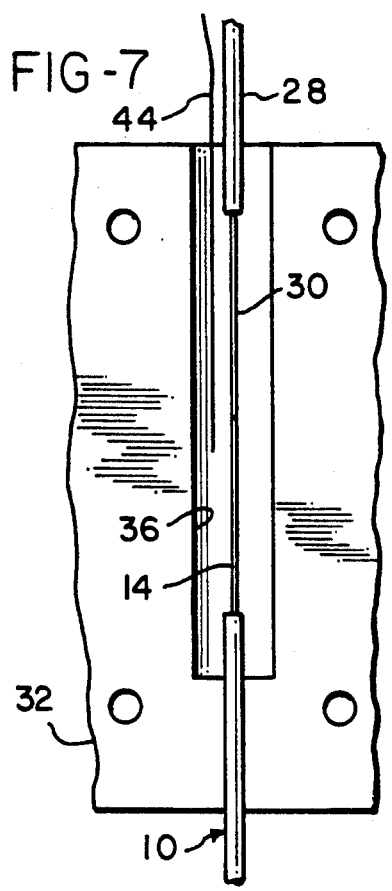
FIG. 7 is similar to FIG. 6 showing the joined fibers of FIG. 5 installed therein, together with a tension member and ready for the other mold half.
Figure 8:
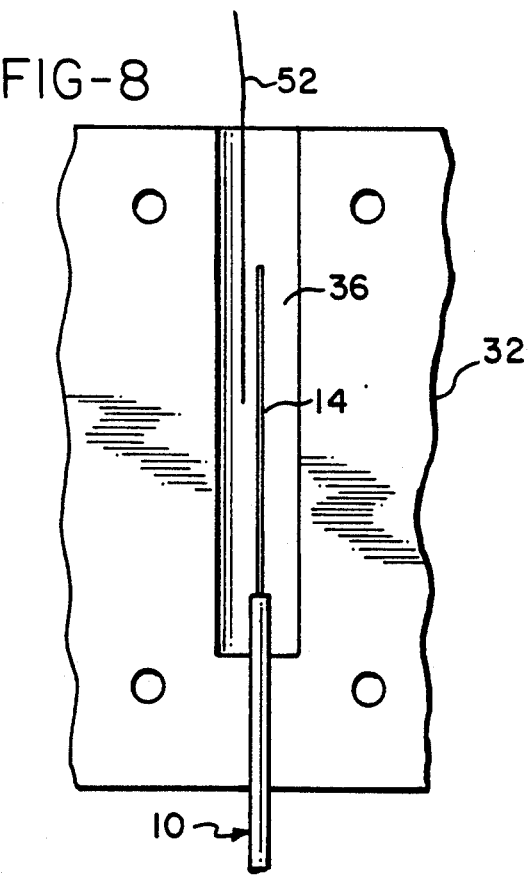
FIG. 8 is a view of the mold half of FIG. 6 with the fiber of FIG. 3 installed therein for use where the optical fiber terminates within; i.e., extends from only one end of the attachment device. Also shown installed within the mold half is a tension member ready for the application of the other mold half.

FIGS. 6, 7 and 8 show mold half 32. Mold half 32 has a flat parting face 34 and a cavity therein. The cavity is in two parts. The larger part is a hemicylindrical cavity 36 of suitable diameter to form the fiber attachment structure. The hemicylindrical cavity has a straight axis in the sheet of the drawing, as the structure is seen in FIG. 6. The hemicylindrical cavity has a diameter of about 0.200 inch. The cavity extends out of the top of the mold half, as seen in FIG. 6. A hemicylindrical groove 38 is axially positioned with respect to cavity 36 to extend out of the bottom of the mold half, as seen in FIG. 6. The diameter of groove 38 is such as to closely receive the buffered optical fiber 10, with its buffer coatings in place. The axial length of the hemicylindrical cavity 36 from the top of the mold half to the top of the groove 38 is about 2.5 inches. A plurality of match holes is formed in mold half 32. Match holes 40 and 42 are specifically identified. There is a corresponding mold half of identical configuration, but with match (indexing) pins therein which engage in the match holes. When the two mold halves are placed together, they define axially positioned cylindrical cavities. Each mold may have a plurality of cavities so that a plurality of fibers may be attached at one time.

The fibers illustrated in FIG. 5 are prepared by cleaning and are loaded into the mold half, as shown in FIG. 7. The coated fiber 10 engages in the groove 38 seen in FIG. 6 to fill the groove. The cylindrical surfaces are smooth and have a constant diameter as a function of length. The length of the cavity 36 is such as to be slightly longer than the length of the bare fiber to be encapsulated in the attachment structure. When the fibers are loaded into the mold half 32, about ¼ inch of the fibers' buffer coatings extend into the main cavity 36. This provides stress relief to the bare (cladded) fibers 14 and 30 where they exit from their buffer coatings, and continuity of environmental protection. To obtain this function on fiber 28, preferably about ¼ inch of the buffer coatings on fiber 28 extends into the top of the cavity 36.

The polymer encapsulating and compressing body molded onto the optical fiber may have a force-applying device also encapsulated therein. To anchor, strain or suspend the encapsulated fiber, a flexible tension member such as wire 44 is inserted into the mold cavity to lie parallel to and close to the bare optical fiber 30.

Each mold half is sprayed with a mold release agent. Then, the fibers and optional wire are loaded, the top half of the mold is mated with the bottom half and secured thereto, such as by screws or external clamps. The mold is held firmly in a fixture with the open end of the cavity upright to permit the pouring of hot, fluid synthetic polymer composition material. The polymer material may contain a thermosetting resin. In order to facilitate pouring the hot polymer material into the mold and ensure a uniform cure, the mold and the fibers are heated in an oven. For the preferred thermosetting material, the mold and fibers are heated to about 250 degrees F. This temperature is sufficiently above the melting point of the uncured resin, but low enough to prevent its unduly rapid curing upon contact with the mold. The temperature of the mold is directly measured by means of an attached thermocouple.

While the mold is heating, the thermosetting polymer material is prepared for pouring. A preferred thermosetting material is a maleimide resin mixed with a toughening modifier. That material is chosen for its suitability for casting, high curing temperature, high tensile strength over the desired temperature range of utilization, high coefficient of thermal expansion, smoothness, and high glass transition point. These properties are required to allow the encapsulating attachment structure to shrink and uniformly compress the optical fiber without breaking either the fiber or the attachment structure. The elevated temperature at which the polymer cures (thermosets) must not be high enough to incur damage to the optical fibers' buffer coatings which are exposed to elevated temperature during the polymer curing process. Any thermosetting material with comparable properties could alternatively be employed.

The thermosetting maleimide resin is measured to the proper weight ratio and mixed with the toughener in a container that is heated to about 250 degrees F. Heating continues during mixing, and when the resin and toughener have been sufficiently heated, liquefied and mixed, the mixture is placed in a vacuum chamber. The chamber is evacuated allowing the hot mixture to outgas. When outgassing activity has considerably slowed, the resin is removed from the chamber and reheated until its viscosity is sufficiently low to permit it to be poured.

Once both the mold and the maleimide have reached the desired temperature, the mold is removed from the oven and the maleimide is poured slowly into the cavity of the mold. Slow pouring helps prevent air bubbles from remaining in the cavity. Careful probing into the top of each cavity, using a thin wire or fiber, removes bubbles that were unavoidably trapped. At this point the flexible tension member, wire 44, is inserted. The wire 44 is a thin steel or nichrome wire which has been cleaned. There is one wire for each cavity, and the wire is axially centered as nearly as possible within the cavity. The wire penetrates about 1 inch into the mold. This wire will provide means for attaching the attachment structure to other fixtures or transducers.

Once the tension member wire is in position, the mold is placed into an oven and subjected to the curing schedule recommended for the polymer resin employed. Once the resin is cured, the mold is allowed to cool. Then, the molds are opened. The hardened polymer in the cavity has become a solid polymer encapsulating and compressing rod structure. The polymer rod and the fibers therein are carefully removed from the mold. The cooling of the encapsulating cast polymer rod exerts a compressive force onto the optical fiber. This provides the grasp of the thermoset polymer onto the fiber so that, at room temperature, the fiber is so firmly held within the cast encapsulating and compressing polymer rod that the fiber will not slip, but would break before it could be axially pulled out.

FIG. 9 shows the longitudinal section through the cast polymer encapsulating and compressing rod 46 showing the fibers and tension member 44 wire therein. The attachment structure is completed by the application of a restrictive member 48. In FIG. 9, that restrictive member is a closely wound coil spring. In its relaxed condition, the inside diameter of the coil spring is smaller than the external diameter of the cast polymer encapsulating rod member 46. The spring is installed by first unwinding it against its spring force until its inside diameter is larger than that of the cast polymer encapsulating rod. Thereupon, the spring is installed over the cast polymer encapsulating rod and is released. As the spring winds up, it grasps the cast polymer encapsulating rod. The coefficient of thermal expansion of the spring is considerably less than that of the polymer encapsulating rod member. Therefore, at elevated temperatures, the spring exerts an increased restrictive force on the polymer encapsulating rod. This external restrictive force counteracts the tendency of the polymer encapsulating rod to expand. The end effect of the spring is, thus, to maintain high compression force at elevated temperatures.

FIG. 10 shows a cross section of the thermoset polymer rod 46 molded around the fiber 14, which includes the core and its cladding. This section through the rod is at a position about halfway down the cavity 36 in FIG. 7. The tension member, wire 44, is also seen. Another manner of providing the compression member is shown in FIG. 10 where the compression member of this embodiment is a metallic coating 50 electro-formed around the polymer rod 46 that was cast around the fiber 14. The restrictive member can be applied by painting the cast polymer encapsulating rod with a conductive paint and then electroforming a sufficiently thick layer of metal, such as copper or nickel, around the outer diameter of the cast polymer encapsulating rod. The restrictive member is usually made of metal, but it needs to have a sufficient combination of a higher Young's modulus and lower coefficient of thermal expansion than the cast thermosetting resin. Here again, the purpose of this restrictive member is to maintain or increase the compressive forces exerted on the fiber by the thermosetting resin while at high operating temperatures. Without such a restrictive member, the thermoset resin would expand away from the fiber as the temperature increased, reducing the compressive force until it reached zero at the curing temperature of the thermoset polymer. When the restrictive member is applied, it must be made to have as close a fit as possible to the outer diameter of the cast polymer encapsulating rod. It must be uniform in length, axially symmetric, and applied at a much lower temperature than the curing temperature of the thermoset resin. The restrictive member is thus necessary to maintain the grasp of the cast polymer encapsulating rod on the optical fiber over the range of temperatures found in difficult environments. The wire 44 can be used to apply tension to the optical fiber 10, or can be used to support a length of the fiber 10 in a vertical installation.

As described above, in some interferometric sensors, one end of each leg of the interferometer does not require a continuous fiber, but attachment of the end of the fiber is still required. The same process as described above can be employed on a fiber end. FIG. 8 shows the fiber 10 of FIG. 3 in the cavity 36 of mold 32. In this case, the buffered portion of the fiber extending into the mold cavity may be 0.4 inch long and the bared portion 14 of the fiber 10 may, for example, be about 1.3 inches long. The fiber is cleaved square, cleaned, silvered and installed in the mold half 32. The other mold half is closed thereon to hold the fiber on the axial centerline of the mold cavity. In the manner previously described, the mold is held in an upright position and the mold and fiber are preheated. The thermosetting polymer encapsulating and compressing compound is prepared, poured into the cavity, and the tension member, wire 52, is installed. The wire 52 is the same as the wire 44. After the thermosetting resin is cured, the mold is opened and the cast polymer encapsulating rod and fiber removed. Next, the restrictive member is applied to the outside of the cast polymer encapsulating rod. The restrictive member may be either a coil spring or an electro-formed metal layer to hold the cast polymer encapsulating rod in compression. This overall attachment structure is suitable for attachment of the end of the optical fiber for support or application of tension, as previously described.

The physics of a fiber optic interferometer require that the differential length between the two legs of the interferometer vary in proportion to the sensed parameters. In order to achieve the required force to stretch this sensor leg of the interferometer, an attachment structure such as that described herein is necessary. The attachment structure must grasp the fiber firmly with no slippage and with an adequate reserve of holding force at the maximum tension. The present attachment structure includes the restrictive member to maintain the holding force even at high operational temperatures. By utilizing a combination of two materials, the thermosetting encapsulating and compressing resin and the metal restrictive member having considerable different temperature coefficients of expansion, the attachment structure provides symmetrically applied compressive forces to the fiber over a large temperature range so that fiber slippage is prevented under all operative tensile loads and thermal conditions.

This invention, having been described in its presently contemplated best mode, is susceptible to numerous modifications, modes and embodiments within the ability of those skilled in the art and without the exercise of the inventive faculty. Accordingly, the scope of this invention is defined by the scope of the following claims.

What is claimed is:

1. An optical fiber attachment structure comprising:
   an optical fiber having a core, a cladding and at least one buffer coating thereon, said buffer coating being removed from a portion of the length of said fiber so that a portion of the bared fiber protrudes from said buffer coating;
   a member of thermosetting polymer encapsulating material positioned and set around the bared portion of said optical fiber and over an adjacent portion of said protective coating thereby providing continuity of coating on said fiber; and
   a tension wire having an end, a portion of said tension wire adjacent said end being molded into said encapsulating member, said wire having a second end which extends out of said encapsulating member, said second end serving for fastening said optical fiber attachment structure to an external holding and tensioning device.

2. The optical fiber attachment structure of claim 1 further including:
   a restrictive member engaged around at least the central portion of said polymer encapsulating member.

3. The optical fiber attachment structure of claim 2 wherein:
   said restrictive member is engaged over at least the portion of said polymer encapsulating member that is positioned directly on said bared fiber.

4. The optical fiber attachment structure of claim 3 wherein said encapsulating member is also engaged on a first end of said tension member to maintain compression of said encapsulating member on both said bared fiber and on said first end of said tension member; and said restrictive member is engaged over at least the portion of said encapsulating member that is directly on said bared fiber.

5. The optical fiber attachment structure of claim 3 wherein:
   said restrictive member is a coil spring wrapped in intimate contact around said encapsulating member after it is positioned.

6. The optical fiber attachment structure of claim 3 wherein:
   said restrictive member is an electro-formed metal coating.

7. An optical fiber attachment structure comprising:
   an optical fiber having a core, cladding on said core and at least one buffer coating thereon, said optical fiber being bared over a portion of the length thereof so that said bared portion of said clad fiber protrudes from its buffer coating;
   an encapsulating member of thermosetting polymer material cast onto said optical fiber so that said member completely embeds the bared length of said optical fiber, said encapsulating member also engaging a portion of said buffer coating adjacent said bared portion, said encapsulating member being formed of a material which, after being thermoset at an elevated temperature, is in compression at room temperature on said bared fiber and on that portion of said buffer coating within said encapsulating member;
   a restrictive member fixed on the outside of said cast polymer encapsulating member to maintain said cast encapsulating member in compression at temperatures above room temperature on that portion of the bare optical fiber engaged within said cast encapsulating member and on the adjacent portion of said buffer coating within said cast encapsulating member; and
   a tension wire having an end, a portion of said tension wire adjacent said end being molded into said encapsulating member, said wire having a second end which extends out of said encapsulating member, said second end serving for fastening said optical fiber attachment structure to an external holding and tensioning device.

8. The optical fiber attachment structure of claim 7 wherein the buffered optical fiber has a splice therein and said optical fiber extends externally from both ends of the said cast encapsulating member.

9. The optical fiber attachment structure of claim 7 wherein the optical fiber is cleaved and silvered to form a reflective end and said reflective end of said optical fiber is within said encapsulating member.

10. The optical fiber attachment structure of claim 7 wherein said encapsulating member is made of maleimide.

11. The optical fiber attachment structure of claim 7 wherein said optical fiber comprises two bared optical fibers spliced together after removal of a portion of their respective buffer coatings, said cast encapsulating member engaging both said bared optical fibers and a portion of each fiber's adjacent buffer coating.

12. The optical fiber attachment structure of claim 7 wherein said optical fiber has first and second ends and a portion of said buffer coating is removed intermediate said ends, said encapsulating member being engaged over said bared portion of said optical fiber and said encapsulating member being engaged over a portion of said buffer coating adjacent said bared portion.

* * * * *